W. LEVY.
COOKING DEVICE.
APPLICATION FILED AUG. 28, 1919.
1,337,524.
Patented Apr. 20, 1920.
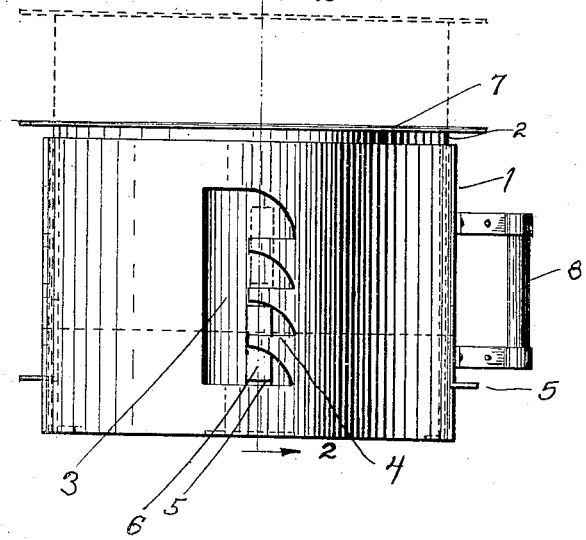
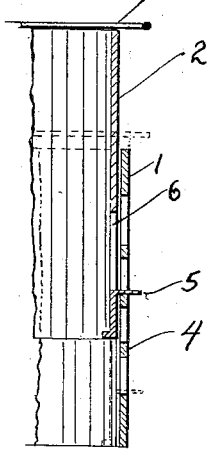
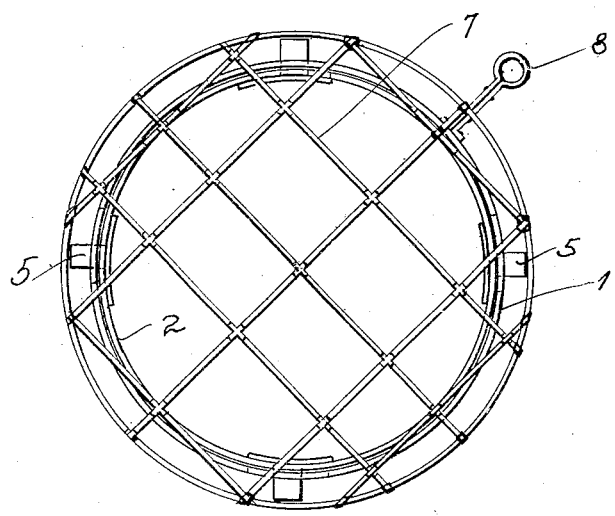
Witnesses
Edward S Allen
LeRoy Allen
INVENTOR
William Levy

UNITED STATES PATENT OFFICE.

WILLIAM LEVY, OF PATERSON, NEW JERSEY.

COOKING DEVICE.

1,337,524.  Specification of Letters Patent.  Patented Apr. 20, 1920.

Application filed August 28, 1919. Serial No. 320,541.

*To all whom it may concern:*

Be it known that I, WILLIAM LEVY, a citizen of the United States, residing at Paterson, in the county of Passaic, in the State of New Jersey, have invented new and useful Improvements in Cooking Devices, of which the following is a specification.

This invention relates to cooking devices and an object thereof is to provide a device so constructed that the substance being cooked may be readily placed at the proper distance above the source of heat.

Another object of the invention is to provide a device of this character in which the material cooked may be kept warm without further cooking.

Another object of the invention is to prevent burning of the foods when constant attention cannot be given to the cooking process.

Still another purpose of the invention is to provide a device so constructed and arranged that foods may be subjected to a quick or a slow heat, depending on the nature of the foods to be cooked. By the use of this device, foods such as rice, potatoes, oatmeal, custard, etc., which formerly required constant attention in cooking, may now be cooked with scarcely any attention and without danger of burning, once the device has been adjusted to proper position.

A further object of this invention is to provide a device of this nature, of few parts, which may be easily assembled and easily operated and one which may be put on the market at a minimum cost.

Other and further objects will be in part obvious and in part pointed out in the following detailed description.

In the drawings:

Figure 1 is an elevation of the device, showing in dotted lines, the inner sleeve in elevated position.

Fig. 2 is a fragmentary section taken on line 2—2 of Fig. 1, showing in dotted lines, the inner sleeve in lowered position.

Fig. 3 is a plan view.

The invention consists of two main members or sleeves, 1 and 2, telescopically arranged. Both of these members may be made of sheet metal, foraminous material or wire; or either may be made of sheet metal and the other of foraminous material or wire.

The outer or lower member 1 is provided with a plurality of vertically arranged slots 3, each of which has one edge thereof serrated to provide teeth or shoulders 4.

The inner or upper member 2, is provided with lugs 5, struck therefrom and bent at an angle thereto, thereby forming openings 6, to permit escape of the heated gases, whereby an excessive heating of the device is prevented. These lugs are, of course, struck at such points, and are of such size as to be properly received in the slots 3. Attached at the upper end of inner member 2, is a grid 7 which may be made of wire or metal strips.

A handle 8 is attached to the outer member for positioning the device on the stove or the like.

In use, when a quick heat is desired, the cooking device will be put in operation with the members completely telescoped, as shown in full lines in Fig. 1. If, on the other hand, a simmering process is desired, or it is desired to keep articles already cooked, in a heated condition until served, the inner member is elevated to the position best suited for the purpose.

This adjustment of the device is accomplished by a relative rotation of the members whereby the lugs are disengaged from the teeth. The inner member is then withdrawn to the desired position and the lugs again caused to engage the teeth, whereby the grid is held in elevated position.

Besides being useful for cooking of such articles as necessarily require a cooking receptacle, this device is also adapted and it is proposed to be used for broiling, toasting and similar processes.

It is obvious that this device is of general application and is not limited to use in connection with any particular heating apparatus.

Having fully described my invention, what I claim as new and desire to secure by Letters Patent is:

1. A cooking device including two relatively movable members, said members being telescopically arranged, teeth on one of said members, lugs struck from the other of said members and adapted to engage said teeth, said members being provided with alined openings to permit escape of the heated gases.

2. A cooking device including two relatively movable members, said members being telescopically arranged, teeth on one of said members, lugs struck from the other of said members and adapted to engage said teeth, said members being provided with alined openings to permit escape of the heated gases, and a grid attached to one of said members.

3. A device of the character described including a cylindrical member, said member being provided with a plurality of substantially vertical slots, one edge of each of said slots being serrated, another cylindrical member telescopically received in said first mentioned member, lugs struck from said second member and engaging the serrated edges of the first member, said second member being provided with slots registering with the slots in the first member, and a grid attached to the top of the second member.

4. A cooking utensil including two relatively movable members, said members being telescopically arranged, one of said members being provided with a slot, one edge of said slot being serrated, a lug struck from the other member, and thereby forming an aperture, said lug adapted to engage said serrated edge, said aperture and slot being alined to permit escape of the heated gases.

WILLIAM LEVY.